UNITED STATES PATENT OFFICE.

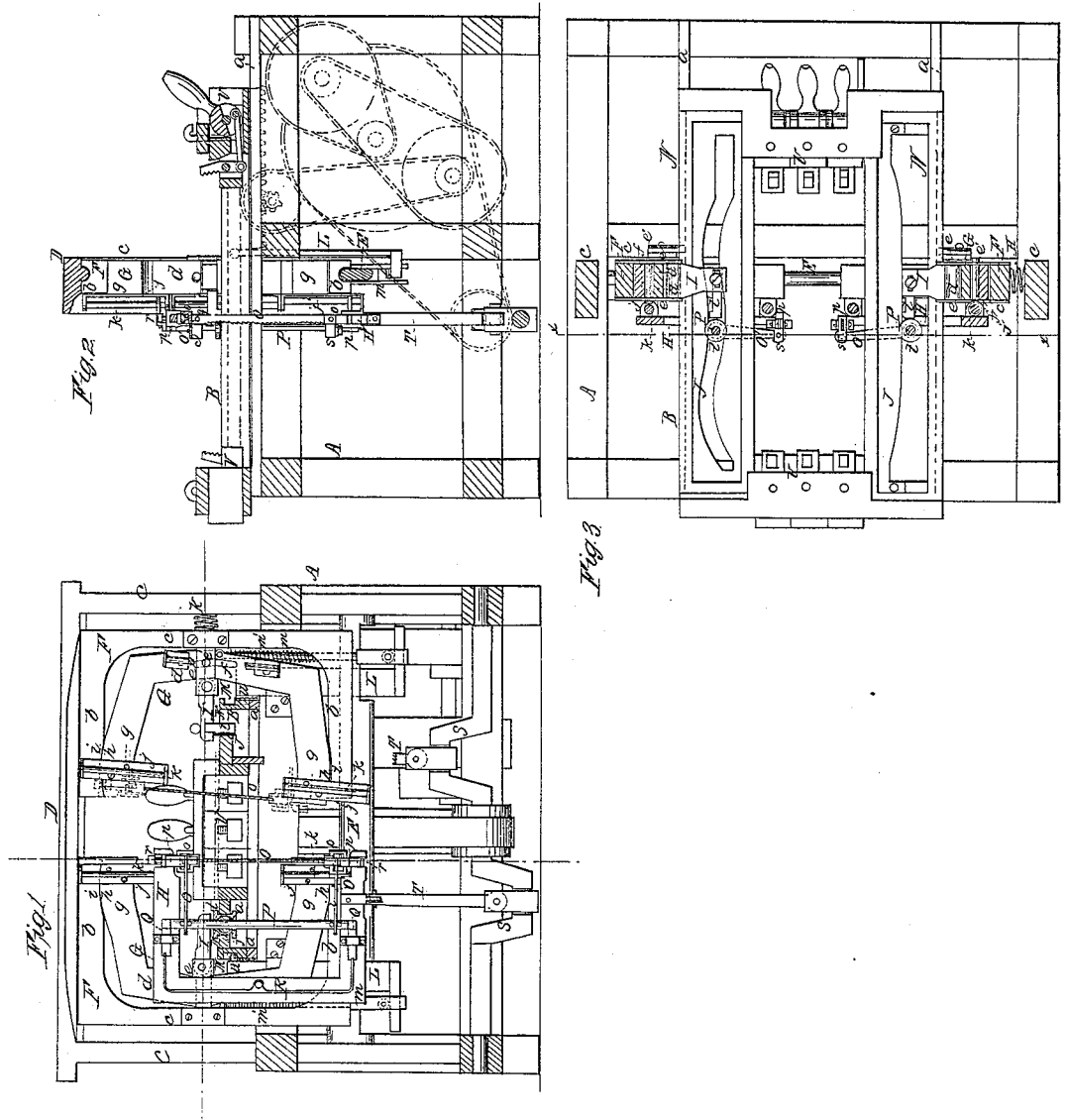

H. VROOMAN, OF LOGANSPORT, INDIANA.

SAWING-MACHINE.

Specification of Letters Patent No. 15,026, dated June 3, 1856.

*To all whom it may concern:*

Be it known that I, HENRY S. VROOMAN, of Logansport, in the county of Cass and State of Indiana, have invented a new and Improved Machine for Sawing Timber in Irregular or Curved Form; and I do hereby declare that the following is full, clear, and exact description of the same, reference being had to the annexed drawings, making a part of this specification, in which—

Figure 1, is a transverse vertical section of my improvement, (*x*), (*x*), Fig. 3, showing the plane of section. Fig. 2, is a longitudinal vertical section of ditto, (*y*), (*y*), Fig. 1, showing the plane of section. Fig. 3, is a horizontal section of ditto, (*z*), (*z*), Fig. 1, showing the plane of section.

Similar letters of reference indicate corresponding parts in the several figures.

To enable those skilled in the art to fully understand and construct my invention, I will proceed to describe it.

A, represents a rectangular frame having two ways or guides (*a*), (*a*), placed longitudinally on its upper part, and B, is a carriage which works on said ways or guides.

C, C, represent two uprights which are placed at each side of the frame A, at opposite points. The upper ends of these uprights are connected by a cross piece D, and a cross bar E, is connected to them a short distance below the upper part of the frame A, said bar being transversely, of elliptical form as shown clearly in Fig. 2.

F, F, represent two frames which are fitted between the two cross pieces or bars D, E. These frames are allowed to slide laterally between said cross pieces or bars. These frames, as shown clearly in Fig. 1, are formed of three pieces, an upper and lower horizontal piece (*b*) and an upright piece (*c*). Within the frames F, two correspondingly shaped frames G, G, are fitted. The upright pieces (*d*) of the frames G, pass between horizontal bars (*e*), (*e*), attached to the uprights (*c*) of the frames F and pins (*e'*) pass through the bars (*e*) and through curved slots (*f*) in the uprights (*d*), as shown in Figs. 1 and 3. The ends of the upper and lower pieces (*g*) of the frames G, are curved at their outer ends, as shown at (*h*), Fig. 1, and fit in concave surface (*i*) in the outer parts of the horizontal pieces (*b*) of the frames F, F. The outer ends of the horizontal pieces (*g*) of the frames G, have each a vertical bar (*j*) attached to them, and these bars have each a guide rod (*k*) secured to them. H, H, are saw sashes which work on the guide rods (*k*). The saw sashes are formed of three pieces each, one vertical and two horizontal pieces similar to the frames F, G. The bars (*e*), (*e*), which are attached to the upright pieces (*c*) of the frames F, have arms I, attached to them, and these arms have each a rod (*l*) secured to them, the ends of which are bent and bear against patterns J, which are secured longitudinally on the carriage B.

K are springs which act against the frames F.

To the back parts of the frames G, there are attached rods (*m*) having spiral springs (*m'*) around them, one to each frame. The lower ends of these rods are secured to upright bars L, L, which have pins (*n*) in their upper ends, said pins bearing upon patterns M, which are formed in the sides of bars N, which form or are attached to the sides of the carriage B.

O, O, are saws which are placed in the saw sashes F, F. The upper and lower ends of the saws are fitted in loops (*o*), (*o*), which are fitted in links (*p*), (*p*), attached to the ends of the horizontal pieces of the saw sashes, the loops (*o*) having points (*q*) on them, which bear upon the links and allow the saws to be turned with but little friction, see Fig. 2. The links (*p*) have screws (*r*) passing through their outer ends by which screws the saws are properly strained in the sashes. The loops (*o*,) (*o*) have projecting arms (*s*) attached to them, and these arms are connected to levers O', which levers are connected to upright rods P, in the saw sashes, the ends of the rods P, being fitted in slides Q on the saw sashes, against which slides, springs R, attached to the saw sashes, bear.

The two saw sashes are driven by cranks S, S, and pitmen T, T, in the usual way and the carriage B, is operated by a rack and pinion in the ordinary way. The carriage B is provided with blocks V, V, having dogs attached, between which, the timber to be sawed is secured to the carriage. The rods P, have friction rollers (*t*) upon them, which bear against them, said rollers being fitted upon spheres (*u*) on the rods, see Fig. 1.

The operation is as follows: As the saws O, work up and down the carriage B is moved in the proper direction to feed the timber to the saws. The patterns J, give a lateral movement to the saws, in consequence of the rods (l) bearing against them, said rods moving the frames F, G, and also the saw sashes and the rods P and levers O, will turn the teeth of the saw in the direction of the line of their cut or turf, because the friction rollers (t) bear against the patterns J. Thus it will be seen how the curved form is given the timber in one direction. Now in case the sides of the stuff or timber are to be cut beveling or winding the patterns M, in the sides of the bars N are made in proper form and the rods L will be raised and lowered, and will turn the frame G, within the frames F, so as to throw the saws O, in oblique position, see Fig. 1. Two saws and their appurtenances are represented, although precisely alike.

With two saws, work or stuff may be sawed, having different shaped sides or edges, and when this is required, the work with two saws is performed at one operation.

The above machine will saw all kinds of irregular or curved work with oblique or "winding" sides, such as ship timber, etc., and is also useful for sawing plow beams, and like articles.

I do not claim giving saws a lateral movement in their sashes for sawing curved or irregularly formed articles, for this has been previously done, but What I do claim as new and desire to secure by Letters Patent, is, 1. I claim the combination of the frames F, G, and sashes H, when connected and arranged as shown, so that the sashes H, and frame G, may be turned within or upon the frames F, and thereby allow the saws to be operated in oblique positions, for the purpose specified.

2. I claim the employment or use of two patterns J, M, when said patterns are so arranged or connected with the frames F, G, and saw sashes H, H, that one pattern J, will give the saw its lateral movement and also turn the saw in the sashes so that their teeth will face the intended direction of the cuts or turfs, while the other pattern M, will move the saw, when necessary, more or less obliquely to give the "winding" or beveled side to the work or stuff, as herein described.

HENRY S. VROOMAN.

Witnesses:
A. M. GRAFFIS,
J. P. WEBSTER.